US011235740B2

(12) United States Patent
Kohlhuber

(10) Patent No.: US 11,235,740 B2
(45) Date of Patent: Feb. 1, 2022

(54) SYSTEM AND METHOD FOR AUTOMATICALLY LONGITUDINALLY GUIDING A MOTOR VEHICLE TO A STANDSTILL

(71) Applicant: Bayerische Motoren Werke Aktiengesellschaft, Munich (DE)

(72) Inventor: Florian Kohlhuber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 16/739,235

(22) Filed: Jan. 10, 2020

(65) Prior Publication Data

US 2020/0148179 A1 May 14, 2020

Related U.S. Application Data

(63) Continuation of application No. PCT/EP2018/068735, filed on Jul. 11, 2018.

(30) Foreign Application Priority Data

Jul. 13, 2017 (DE) ..................... 10 2017 212 034.7

(51) Int. Cl.
*B60T 7/12* (2006.01)
*B60T 8/171* (2006.01)
(Continued)

(52) U.S. Cl.
CPC ............... *B60T 7/12* (2013.01); *B60T 8/171* (2013.01); *B60T 8/174* (2013.01);
(Continued)

(58) Field of Classification Search
CPC . B60T 7/12; B60T 8/171; B60T 8/174; B60T 2210/32; B60W 2552/53;
(Continued)

(56) References Cited

U.S. PATENT DOCUMENTS

2004/0119610 A1* 6/2004 Maemura ............. B62D 15/028
340/932.2
2005/0085984 A1* 4/2005 Uhler ........................ B60T 7/22
701/70
(Continued)

FOREIGN PATENT DOCUMENTS

CN 103534741 A 1/2014
CN 104066638 A 9/2014
(Continued)

OTHER PUBLICATIONS

Chinese-language Office Action issued in Chinese Application No. 201880045422.7 dated Jul. 1, 2021 with English translation (22 pages).
(Continued)

*Primary Examiner* — Mary Cheung
(74) *Attorney, Agent, or Firm* — Crowell & Moring LLP

(57) ABSTRACT

A system and a method automatically longitudinally guide a motor vehicle. The system is used to automatically brake the motor vehicle to a standstill on the basis of a detected infrastructure component which requires a braking of the motor vehicle to a standstill. The system includes a sensor unit which is designed to detect an infrastructure component that requires a braking of the motor vehicle to a standstill, a first determining unit which is designed to determine a standstill position on the basis of currently provided information of the sensor unit upon detecting the infrastructure component, a second determining unit which is designed to determine an adapted standstill position upon no longer detecting the infrastructure component on the basis of the determined standstill position when the infrastructure component was still detected, and a control unit which is designed to automatically initiate a braking to the standstill (Continued)

into the determined standstill position or the determined adapted standstill position.

11 Claims, 3 Drawing Sheets

(51) Int. Cl.
  *B60T 8/174* (2006.01)
  *G06K 9/00* (2006.01)

(52) U.S. Cl.
  CPC ..... *G06K 9/00818* (2013.01); *G06K 9/00825* (2013.01); *B60T 2210/32* (2013.01)

(58) Field of Classification Search
  CPC ......... B60W 2754/30; B60W 2556/25; B60W 2556/20; B60W 2554/408; B60W 30/14; B60W 30/181; B60W 30/18154; G06K 9/00818; G06K 9/00825; G08G 1/0112
  See application file for complete search history.

(56) References Cited

U.S. PATENT DOCUMENTS

| | | |
|---|---|---|
| 2009/0174574 A1 | 7/2009 | Endo et al. |
| 2009/0312888 A1 | 12/2009 | Sickert et al. |
| 2010/0256835 A1 | 10/2010 | Mudalige |
| 2010/0283632 A1* | 11/2010 | Kawabata .............. G08G 1/165 340/932.2 |
| 2011/0066343 A1 | 3/2011 | Ota et al. |
| 2011/0098898 A1 | 4/2011 | Stählin et al. |
| 2011/0128139 A1* | 6/2011 | Tauchi .................. B60Q 9/008 340/439 |
| 2011/0190972 A1 | 8/2011 | Timmons et al. |
| 2013/0275019 A1* | 10/2013 | Murata ..................... B60T 7/22 701/70 |
| 2014/0088850 A1 | 3/2014 | Schuberth |
| 2014/0095009 A1* | 4/2014 | Oshima .................. G05D 1/021 701/23 |
| 2015/0105989 A1 | 4/2015 | Lueke et al. |
| 2017/0113686 A1 | 4/2017 | Horita et al. |
| 2017/0160743 A1 | 6/2017 | Schweikl |
| 2017/0320473 A1* | 11/2017 | Ohbayashi ............. G08G 1/166 |
| 2018/0012088 A1 | 1/2018 | Matsuo et al. |
| 2020/0070859 A1* | 3/2020 | Green ..................... G01S 17/58 |

FOREIGN PATENT DOCUMENTS

| | | |
|---|---|---|
| CN | 104340223 A | 2/2015 |
| CN | 106103232 A | 11/2016 |
| CN | 106663374 A | 5/2017 |
| CN | 106816021 A | 6/2017 |
| DE | 102 38 525 A1 | 3/2004 |
| DE | 10 2008 010 968 A1 | 9/2009 |
| DE | 10 2011 009 665 A1 | 12/2011 |
| DE | 10 2012 111 740 A1 | 6/2014 |
| DE | 10 2013 001 018 A1 | 7/2014 |
| DE | 10 2013 226 599 A1 | 6/2015 |
| DE | 10 2015 224 112 A1 | 6/2017 |
| EP | 3 168 823 A1 | 5/2014 |

OTHER PUBLICATIONS

International Search Report (PCT/ISA/210) issued in PCT Application No. PCT/EP2018/068735 dated Oct. 19, 2018 with English translation (five (5) pages).
German-language Written Opinion (PCT/ISA/237) issued in PCT Application No. PCT/EP2018/068735 dated Oct. 19, 2018 (six (6) pages).
German-language Search Report issued in counterpart German Application No. 102017212034.7 dated Jan. 4, 2018 with partial English translation (12 pages).

\* cited by examiner

SYSTEM AND METHOD FOR AUTOMATICALLY LONGITUDINALLY GUIDING A MOTOR VEHICLE TO A STANDSTILL

CROSS REFERENCE TO RELATED APPLICATIONS

This application is a continuation of PCT International Application No. PCT/EP2018/068735, filed Jul. 11, 2018, which claims priority under 35 U.S.C. § 119 from German Patent Application No. 10 2017 212 034.7, filed Jul. 13, 2017, the entire disclosures of which are herein expressly incorporated by reference.

BACKGROUND AND SUMMARY OF THE INVENTION

The invention relates to a system and a method for automated longitudinal guidance of a motor vehicle to a standstill on the basis of an identified infrastructure component that requires braking of the vehicle to a standstill.

The prior art already discloses various driver assistance systems that assist the driver with their driving task, said driver assistance systems identifying signaling devices, e.g., traffic lights or their light state, up ahead and taking these into account when controlling the driver assistance systems.

By way of example, DE 10 2008 010 968 A1 discloses a system for displaying information in a vehicle, comprising an image detection unit for detecting the vehicle surroundings, an evaluation unit for evaluating the image data with respect to the presence of road signs or traffic infrastructure and a display unit for presenting information should at least one road sign or traffic infrastructure be identified. In detail, the system is distinguished by virtue of adapted information being displayed depending on the current or planned route should different road signs or different traffic infrastructure be detected for different route options.

DE 10 2013 226 599 A1 discloses a method for adaptive distance and speed control of a vehicle, wherein the vehicle can be automatically braked to a standstill on account of a detected infrastructure component.

DE 10 2015 224 112 A1 discloses a system for influencing vehicle systems by taking account of relevant signaling devices, wherein information about identified, covered signaling devices is also taken into account for the identification of relevant signaling devices.

It is now an object of the invention to provide an improved and safe automated vehicle longitudinal guidance in the case of a (no longer) unambiguously identified traffic infrastructure component.

This and other objects are achieved by a system and a method in accordance with the claimed invention.

The invention is based on the discovery that, in the case of a camera-based identification of the relevant infrastructure components, the measurement error by the image processing increases disproportionately with distance due to the technology; i.e., the position of an infrastructure component determined by the image processing may deviate from the actual position. However, slow deceleration of the vehicles is sought-after at the same time during automated braking procedures in order to experience comfortable braking. Accompanying this, so-called target braking must be started at greater distances and hence in a region of greater measurement errors. If visual contact with the traffic infrastructure component (traffic light, road sign, markings) is lost, calculations can be continued briefly on the basis of the odometer until the visual contact returns. Following this (when visual contact with the traffic infrastructure component returns), there is an increasingly better measurement or determination of the remaining distance to the target standstill position as a result of the shorter distance.

However, if the loss of visual contact is ongoing or the visual contact no longer returns—e.g., as a result of trucks ahead—, the determined distance can no longer be updated. This may lead to the standstill position to be obtained and determined on the basis of the data of the camera-based sensor unit deviating from the actual position at which the vehicle must achieve standstill. If visual contact with the infrastructure component is only established again just before the determined standstill position, uncomfortable deceleration may be required to be able to reach the standstill position—which can now be determined more accurately.

In order to improve known systems for automated longitudinal guidance of a motor vehicle, said system enabling the motor vehicle to be automatically braked to a standstill on the basis of an identified (detected) infrastructure component that requires braking of the motor vehicle to a standstill, the following subsystems are provided:

a sensor unit which is designed to identify an infrastructure component that requires braking of the motor vehicle to a standstill, a first determination unit which, upon identification of the infrastructure component, is designed to determine a standstill position on the basis of currently available information (in respect of the infrastructure component) from the sensor unit, the motor vehicle having to be braked to a standstill when said standstill position is reached, a second determination unit which may be part of the first determination unit and which, should the infrastructure component (relevant to the target braking) no longer be identified (e.g., on account of loss of visual contact), is designed to determine an adapted standstill position on the basis of the determined standstill position when the infrastructure component was (still) identified and a determined error value, and a control unit which, upon identification of an infrastructure component relevant to the target braking, is designed to initiate automated braking to a standstill at the determined standstill position and which, should the relevant infrastructure component no longer be identified, is designed to initiate automated braking to a standstill at the determined adapted standstill position.

Expressed more simply, according to the invention and under the precondition that an infrastructure component requiring a braking of the motor vehicle to a standstill is initially identified and a determination of a standstill position was undertaken on the basis of currently available information from the sensor unit, provision is made for the last determined and applicable standstill position to be appropriately adapted and used for longitudinal guidance while taking account of a determined error value whenever this infrastructure component or the relevant information from this infrastructure component is no longer able to be detected. Consequently, it is also possible to ensure that possible measurement errors of the sensor unit do not have a negative effect on the determination of the standstill position, even in the case of loss of visual contact.

The system for automated longitudinal guidance can be part of a system for automated driving. The term "automated driving" comprises automated driving with any degree of automation. Exemplary degrees of automation include assisted driving, partly automated driving, highly automated driving or fully automated driving. These degrees of automation were defined by the Bundesanstalt für Straßenwesen [Federal Highway Research Institute] (BASt) (see BASt publication "Forschung kompakt", issue November 2012). In the case of assisted driving, the driver permanently performs longitudinal or transverse guidance while the system takes over the respective other function within certain limits. In the case of partly automated driving (TAF), the system takes over the longitudinal and transverse guidance for a certain period of time and/or in specific situations, with the driver having to permanently monitor the system like in assisted driving. In the case of highly automated driving (HAF), the system takes over the longitudinal and transverse guidance for a certain period of time without the driver having to permanently monitor the system; however, the driver must be able to take over the vehicle control within a certain amount of time. In the case of fully automated driving (VAF), the system is able to automatically manage driving in all situations for a specific application; a driver is no longer necessary for this application. The aforementioned four degrees of automation according to the definition of the BASt correspond to SAE (Society of Automotive Engineering) levels 1 to 4 of the SAE J3016 standard. For example, highly automated driving (HAF) corresponds to level 3 of the SAE J3016 standard according to BASt. Further, SAE J3016 still provides SAE level 5 as highest degree of automation, which is not contained in the definition by the BASt. The SAE level 5 corresponds to driverless driving, in which the system can automatically manage all situations like a human driver during the whole journey; in general, a driver is no longer necessary.

The term sensor unit should be understood to mean any type of sensor unit that operates in a camera-based fashion, at least in part. By way of appropriately embodied image processing, infrastructure components and the position thereof, which require braking to a standstill, can be identified from the images obtained.

Stationary or temporarily stationary traffic light installations and/or road signs and/or relevant markings such as, e.g., stop lines or pedestrian crossings, or the like, should be subsumed under the term infrastructure components. The stopping position is predetermined on the basis of the type and position of the infrastructure component determined.

In an analogous application of the basic concept of the apparatus according to the invention, a correspondingly embodied method for automated longitudinal guidance of a motor vehicle, said method enabling automatic braking of said motor vehicle to a standstill on the basis of an identified infrastructure component that requires braking of the motor vehicle to a standstill, is distinguished, according to the invention, by the following steps:

identifying an infrastructure component that requires braking of the motor vehicle to a standstill, upon identification of the infrastructure component, determining a standstill position on the basis of currently available information about the infrastructure component (e.g., type and/or position of the infrastructure component) from the sensor unit, should the previously identified infrastructure component no longer be identified by the sensor unit, determining an adapted standstill position on the basis of the determined standstill position when the infrastructure component was still identified and a determined error value, and, upon identification of an infrastructure component (by the sensor unit), initiating automated braking to a standstill at the determined standstill position and, should the infrastructure component no longer be identified (by the sensor unit), initiating automated braking to a standstill at the determined adapted standstill position.

Advantageous developments of the apparatus according to the invention also apply analogously to the method according to the invention.

Further relevant information, such as, e.g., the data of a navigation system, can be taken into account when determining the standstill position on the basis of currently available information from the sensor unit about a currently identified infrastructure component. These data from navigation systems and/or the available data about the identified infrastructure component (type and/or position of the infrastructure component) can be complemented by correspondingly provided data from other road users or from a central traffic system by means of car-to-X communication.

Taking account of a determined error value plays an essential role in determining the adapted standstill position when the relevant infrastructure component can no longer be detected by the vehicle-inherent sensor system. The better the determined error value, the more accurately the standstill position can be adapted. The error value should be a measure for how large (in absolute, relative, percentage terms) the deviation of the determined standstill position can be from the actual stopping position. To this end, the error value can be determined on the basis of detected or detectable relevant information about the fuzziness or a possible error in the (preceding) determination of the standstill position with currently available information about the relevant infrastructure component currently identified by the sensor unit.

In the simplest case, the error value reproduces an error distance or an error path specifying the length of distance or path by which the determined standstill position can deviate from the actual stopping position that is applicable on account of the infrastructure component.

In the case of such an error value, the adapted standstill position advantageously can be determined by calculating the difference between last determined standstill position and determined error value; i.e., if visual contact with the infrastructure component is lost or the latter is no longer identified, the determined error path is subtracted from the previously determined standstill position such that the arising adapted standstill position lies in front of, i.e., is reached before, the—previously—determined standstill position. What can be achieved as a result of this is that the actual applicable stopping position is not exceeded or there is no uncomfortable deceleration.

In order to be able to ensure with a very high probability or in order to preclude the actual stopping position being overshot on account of the automated longitudinal intervention, provision can be made for the adapted standstill position to be determined on the basis of the determined standstill position when the infrastructure component was identified and on the basis of a determined worst-case error value, in particular by calculating the difference between determined standstill position and determined worst-case error value, the worst-case error value being determined from available information about a worst-case scenario when determining the standstill position. The term worst-case scenario should be understood to mean those scenarios in which the sensor unit supplies maximally inaccurate or "poor" data such that, on account of this maximally poor information provided by the sensor unit, a standstill position that deviates to the greatest possible extent from the actual stopping position is determined.

The error value to be taken into account can advantageously be determined by way of a requirement specification in the form of a so-called lookup table.

In order to determine the error value, in particular the worst-case error value, it is possible to take account of all available relevant information that may have an influence on the standstill position determined on the basis of the available information about the infrastructure component from the sensor system. In particular, the (worst-case) error value can be determined on the basis of available information about the (distance-dependent) measurement accuracy errors of the sensor unit. Thus, a table may be stored in, e.g., the vehicle, said table specifying the percent by which the determined distance or position can deviate at most from the actual distance or position when determining the distance or position of an identified infrastructure component, this specification being provided as a function of distance.

As an alternative or in addition thereto, the error value, in particular the worst-case error value, can (also) be determined on the basis, or taking account, of available information about the current vehicle speed, the last detected or determined distance between the motor vehicle and the last determined standstill position, information about the weather and/or time of day and/or further available information about the vehicle surroundings. In particular, information about the position of the sun (e.g., low sun) or about other atmospheric conditions that have an influence on the "vision" of the sensor system (e.g., heavy rain or snow) can be taken into account when determining the error value.

As an alternative or in addition thereto, the error value, in particular the worst-case error value, can (also) be determined on the basis of available fleet data from other road users, which may, in particular, be made available by linking the vehicle or the system to a backend system. In particular, the error value in this case can be determined in derivative and/or surrounding individual fashion. Advantageously, the fleet data (fl) may comprise at least one or more of the following information items: vehicle derivative, type of sensor, distance-dependent determined sensor signal and/or retrospectively corrected sensor signal. By way of example, the fleet data can be (distance-dependent) measurement error values of the same sensor units or determined error values under the same or similar (operating) conditions (e.g., atmospheric conditions, time of day, speed, distance) or traffic situations.

It is likewise contemplated for the error value, in particular the worst-case error value, to be determined on the basis of available information about earlier determined error values, either from the own vehicle or from other vehicles or road users (so-called fleet data), the information of which was made available. Thus, for example, how "good" the error value was can be determined every time "visual contact returns" and the adapted standstill position is reached, or at a later time, from the last determined error value and the deviation between the adapted standstill position and the actual stopping position to be obtained, with which the sensor unit should now have visual contact again. Thus, e.g., vehicles—once they have driven past the relevant infrastructure component—can know what sensor value was obtained for what distance, or are able to determine this retrospectively by odometry. Additionally, further relevant parameters that may have an influence on the sensor value (e.g., time of day, position of the sun, atmospheric conditions) may be assigned to this data pair. This data or information can be transmitted to an external data memory (backend), which can then in turn be called by (other) vehicles. From this, assumptions for future error values can be derived. By way of example, the case may occur that, on account of local conditions (traffic lights slightly twisted, a plurality of traffic lights), the distance is always underestimated to a relatively large extent in the case of a low sun. However, this "error" can be identified retrospectively and can be transferred with a notification to the backend such that other vehicles are able to better determine the error value or the actual distance to the (actual) stopping position in similar situations when this information is taken into account.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
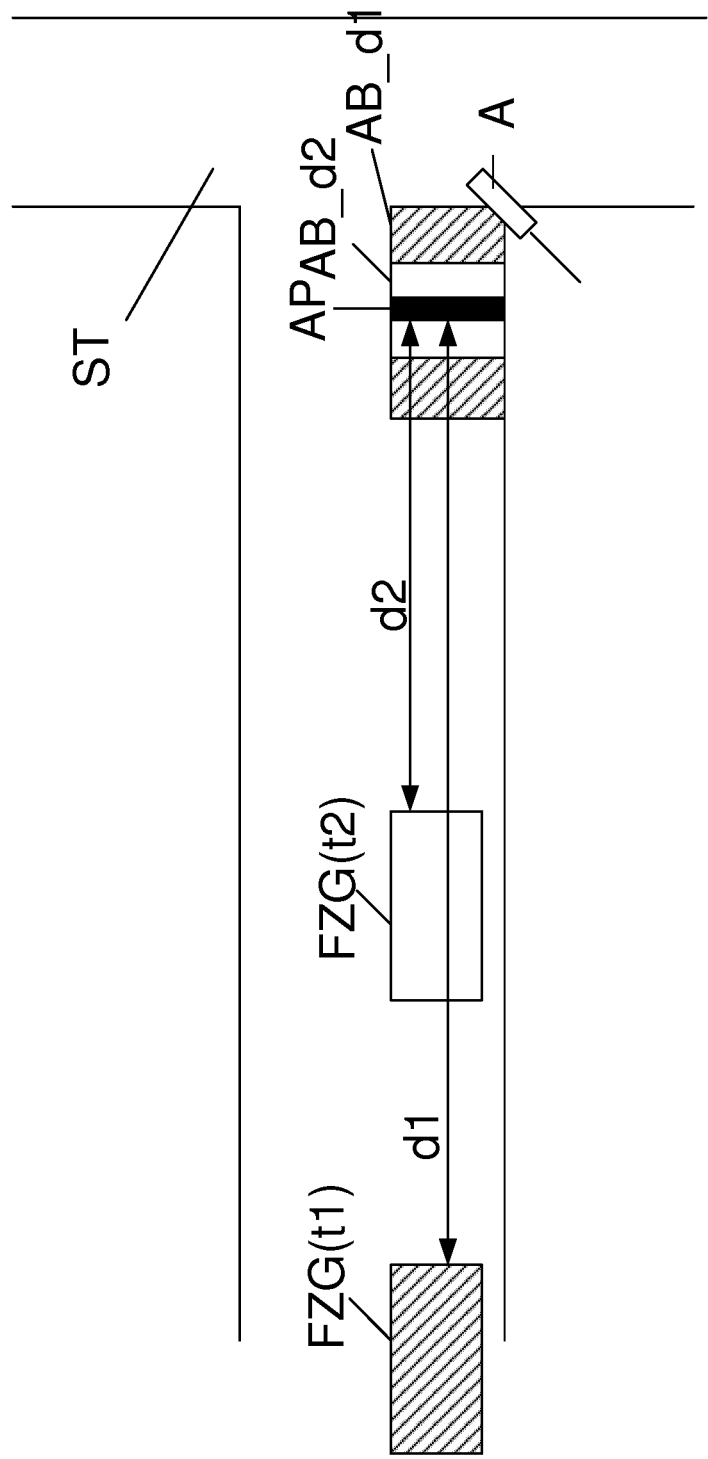
FIG. 1 shows a traffic situation for elucidating possible measurement errors of a camera-based sensor unit of a vehicle.

FIG. 1 shows a traffic situation for elucidating possible measurement errors of a camera-based sensor unit of a vehicle, wherein a vehicle FZG approaches a T-junction equipped with traffic lights A. On account of the position of the traffic lights A and the current signaling (red), the vehicle must not drive beyond the stopping position AP.

At the time t1, the vehicle FZG with the forwardly directed camera-based sensor unit identifies the traffic lights A as a relevant infrastructure component that requires braking of the vehicle to a standstill. On account of the current distance d1 of the vehicle FZG from the traffic lights A at the time t1, a standstill position lying in the stopping region AB_d1 (hatched region including the white region AB_d2 and the stopping position AP) is determined on account of the measurement errors of the sensor unit. As the vehicle FZG continually moves forward, the measurement error decreases with reducing distance. Thus, for example, the vehicle FZG is already closer to the traffic lights A at the time t2. On account of the current distance d2 of the vehicle FZG from the traffic lights A, a standstill position lying in the stopping region AB_d2 (white region including stopping position AP) is determined. This region AB_d2 is already substantially smaller than the region AB_d1, i.e., the maximum deviation of the determined standstill position in relation to the actual stopping position is already substantially smaller than at the time t1.

In order to be able to ensure no travel beyond the actual stopping position AP, the last determined standstill position must be adapted in such a way in the case of a possible loss of visual contact with the infrastructure component that travel therebeyond is avoided. According to the invention, this is ensured by taking account of a determinable error value when determining the standstill position (=adapted standstill position).

Figure 2:
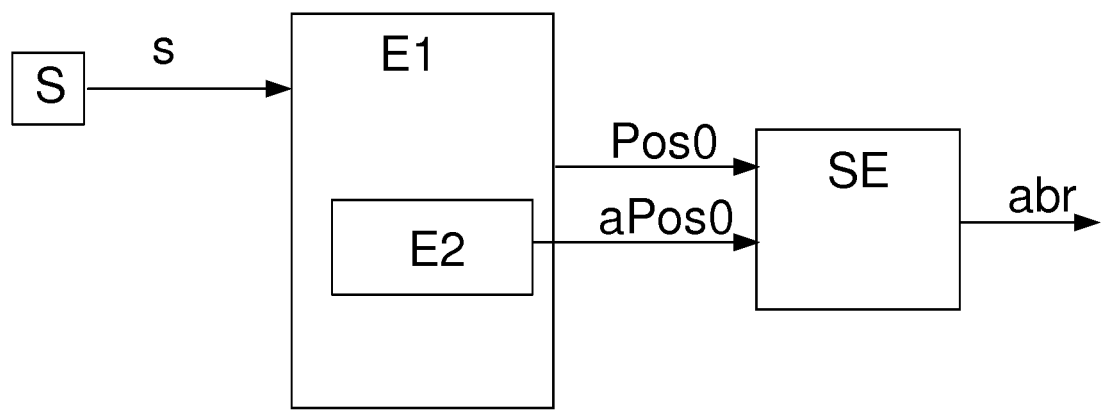
FIG. 2 shows a greatly simplified structure of an exemplary system according to the invention for automated longitudinal guidance of a motor vehicle.

The system, illustrated in FIG. 2, for automated longitudinal guidance of a motor vehicle, said system enabling said motor vehicle to be automatically braked on the basis of an identified infrastructure component that requires braking of the motor vehicle to a standstill, at least in the current traffic situation, e.g., traffic lights or a stop sign, comprises the following components:

a camera-based sensor unit S,
a first determination unit E1,
a second determination unit E2, which is part of the first determination unit E1, and
a control unit SE for initiating an automated braking of the vehicle to a standstill.

The camera-based sensor unit S is designed to identify relevant infrastructure components that require braking of the vehicle to a standstill. The infrastructure components can be relevant traffic lights, stop signs or the like. Likewise, these can also be road signs where braking of the vehicle at a certain position is necessary on account of the current traffic situation. By way of example, this could be a pedestrian crossing that is intended to be crossed by a further road user. The sensor unit transfers relevant data s (e.g., type or position of, or distance from, an infrastructure component) to the first determination unit E1.

The first determination unit E1 is designed to determine a standstill position Pos0 on the basis of the currently available information s from the sensor unit S when a relevant infrastructure component is identified; the vehicle must have been braked to a standstill once said vehicle reaches said standstill position. By way of example, the standstill position Pos0 is the position of the stop line—if present—or—should no stop line be present—the position of a virtual stop line.

The second determination unit E2 serves to determine an adapted standstill position aPos0. This adapted standstill position aPos0 must be determined if the camera-based sensor unit S no longer identifies the previously identified, relevant infrastructure component, i.e., in the case of a loss of visual contact or a sensor outage, for example. What is essential here is that, in addition to the previously determined standstill position Pos0, the second determination unit E2 also takes account of the fact that said previously determined standstill position may still deviate to a greater or lesser extent from the actual stopping position to be reached, the intention being to actually reach said stopping position, when determining the adapted standstill position aPos0 depending on the distance from the standstill position. An exemplary determination process is explained below with reference to FIG. 3.

The control unit SE is designed to initiate, depending on the currently present situation, an automated braking of the vehicle to the determined standstill position Pos0 or the determined adapted standstill position aPos0 by virtue of emitting a corresponding control signal abr to the relevant actuator system, which is not illustrated here in any more detail. Should the relevant infrastructure component that requires braking of the vehicle to a standstill be identified by the camera-based sensor unit S at the time of the intervention by the longitudinal guidance, the control unit SE initiates automated braking of the vehicle to the determined standstill position Pos0, which is determined on the basis of the current data s of the sensor unit. However, should the sensor unit S no longer identify the relevant infrastructure component, for example because it is covered or the sensor unit S is defective, the control unit SE initiates automated braking of the vehicle to the determined adapted standstill position aPos0, which is determined on the basis of the most recently determined standstill position Pos0 and a determined error value.

Figure 3:
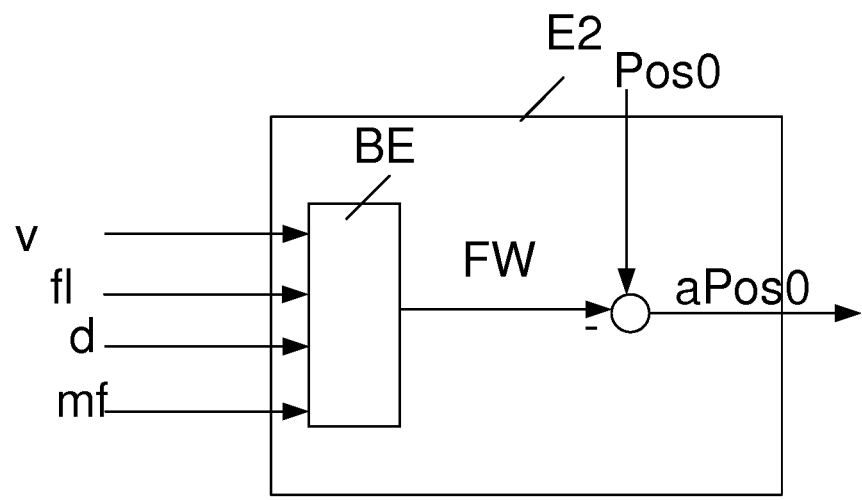
FIG. 3 shows an exemplary configuration of a second determination unit according to the invention for determining an adapted standstill position.

An exemplary detailed configuration of the second determination unit E2, which serves to determine an adapted standstill position in the case of loss of visual contact with the relevant infrastructure component, is shown in FIG. 3.

In addition to the determined standstill position Pos0 of the first determination unit E1, the second determination unit E2 receives further input signals v, d, mf and fl, which serve to determine an error value FW. The error value FW specifies the greatest possible deviation of the determined standstill position Pos0 from the actual stopping position on account of the traffic situation or the traffic infrastructure. Consequently, the error value FW ideally specifies a distance showing by what (maximum) distance the actual stopping position can deviate (at most) from the determined standstill position Pos0.

By means of a calculation unit BE provided to this end, this error value FW can be determined on the basis of at least one of the following available information items:

velocity v of the vehicle,
distance d of the vehicle from the determined standstill position Pos0,
relevant fleet data fl available, in particular derivate-individual and/or surroundings-individual fleet data, and/or
information from the sensor unit S, in particular information mf about specified (distance-dependent) measurement errors of the sensor unit.

Here, the information about the distance d can be determined, once again, by taking account of data from a navigation system. The fleet data fl can be provided by a link to a car-to-car or car-to-X system. Ideally, the fleet data fl may contain at least one or more of the following information items: vehicle derivative, type of sensor, distance-dependent determined sensor signal (=measured distance value) and/or retrospectively corrected sensor signal (=actual distance value). The determined measured sensor signals may also be assigned further attributes, such as, e.g., atmospheric conditions, time of day, position of the sun, vehicle speed and/or further local conditions. Likewise, these information items can also be supplied to the retrospectively corrected sensor signals so as to provide clarity about the preconditions at which any sensor signal was determined and how this was retrospectively corrected. These collected information items can be stored in the backend in a so-called lookup table and can hence be made available to other vehicles.

The specified measurement errors mf of the sensor unit can be determined accordingly, either by way of information provided by the manufacturer or by preceding measurements, and can be made available. Likewise, current atmospheric condition information such as, e.g., low sun, heavy rain or heavy snowfall and/or time-of-day information items (day, night) can be taken into account.

An adapted standstill position aPos0, which is taken into account by the longitudinal guidance in the case of a loss of visual contact, can be determined from the determined standstill position Pos0 and the determined error value FW by calculation of the difference (standstill position Pos0 minus the error value FW).

Figure 4:
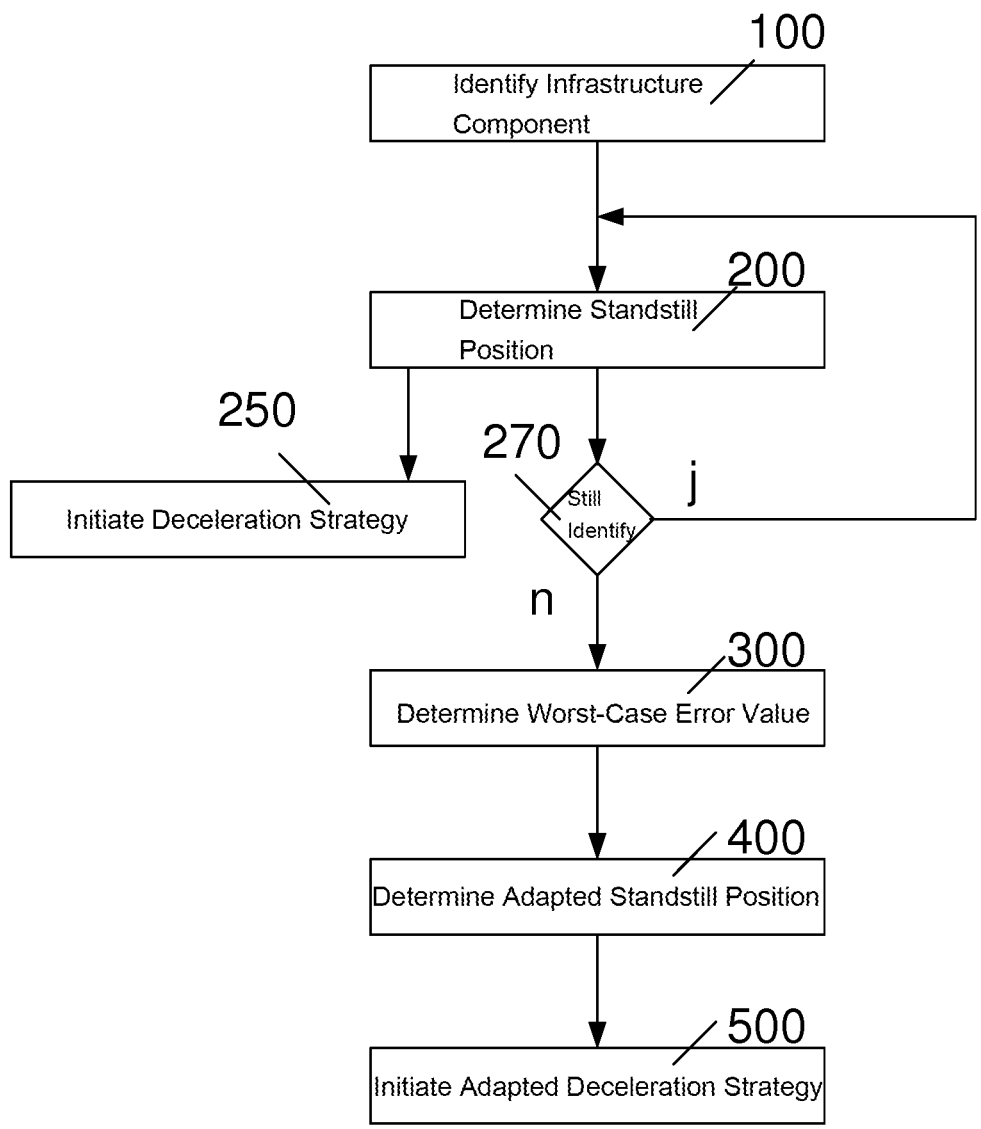
FIG. 4 shows an exemplary flowchart for carrying out a method according to the invention.

FIG. 4 now shows an exemplary flowchart for carrying out a method for automated longitudinal guidance of a motor vehicle, said method enabling said motor vehicle to be automatically braked to a standstill on the basis of an identified infrastructure component that requires braking of the motor vehicle to a standstill.

The method starts during an active automated longitudinal guidance in step 100, where there is continuous querying as to whether the sensor unit identifies a light signaling installation or stop sign, which requires braking of the motor vehicle to a standstill, within the meaning of an infrastructure component. If such an infrastructure component is identified, a standstill position, at which point the motor vehicle must have been braked to a standstill, is subsequently determined in step 200 on the basis of currently available information from the sensor unit about the identified infrastructure component and optional further parameters. Subsequently, a deceleration strategy until the standstill position is reached is determined on the basis of the determined standstill position and further information items (e.g., current position and velocity of the vehicle), and said deceleration strategy is initiated accordingly in step 250.

At the same time as step 250, there is a query in step 270 as to whether the sensor unit still identifies this infrastructure component. In the affirmative, there is a return to step 200 and the standstill position is determined or the previously determined standstill position is adapted accordingly on the basis of the currently available information items from the sensor unit about the identified infrastructure component and optionally further parameters. Subsequently, the deceleration strategy until the standstill position is reached is determined again in step 250 on the basis of the determined new or adapted standstill position and further information items (e.g., current position and velocity of the vehicle), and said deceleration strategy is initiated accordingly.

However, should step 270 yield that the sensor unit no longer identifies the infrastructure component (e.g., because it is covered or the sensor unit is defective), there is a transition from step 270 to step 300. In step 300, a worst-case error value that specifies the size of the maximum deviation of the determined standstill position from the actually decisive stopping position is determined on the basis of the information available about the sensor unit (information about the specification of the camera in respect of measurement error distributions) and any other further information that provides information about possible deviations of the determined virtual stop position (standstill position) in relation to the actual standstill position to be reached (e.g., the distance from the last determined standstill position, time of day (optional), atmospheric conditions (optional), relevant information from other vehicles (optional), . . . ). Subsequently, an adapted standstill position is determined in step 400 on the basis of the determined standstill position when the infrastructure component was identified and the determined error value by way of calculating the difference therebetween (determined standstill position minus error value).

Following the determination of the adapted standstill position, the initiated longitudinal guidance according to step 250 is terminated in step 500 and, instead, a deceleration strategy until the standstill position is reached is determined on the basis of the determined adapted standstill position and further information items (e.g., current position and velocity of the vehicle), and said deceleration strategy is initiated accordingly.

At the same time, there is a return to step 270 and there is renewed querying as to whether the sensor unit identifies the infrastructure component (again). If not, steps 300-500 are carried out again. However, should the infrastructure component be identified again, the initiated longitudinal guidance is terminated after step 500 and carried out following step 250. The entire method is carried out until the current standstill position (standstill position or adapted standstill position) is reached.

The invention explained here ensures that there is no travel beyond the actual stopping position, even if there is very early loss of visual contact with the relevant infrastructure component. Instead, there tends to be braking to a standstill in front of the actual stopping position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for automated longitudinal guidance of a motor vehicle, said system enabling said motor vehicle to be automatically braked to a standstill on the basis of an identified infrastructure component that requires braking of the motor vehicle to a standstill, comprising:
   a sensor unit that identifies an infrastructure component that requires braking of the motor vehicle to a standstill;
   a first determination unit which, upon identification of the infrastructure component, determines a standstill position on the basis of currently available information about the infrastructure component from the sensor unit;
   a second determination unit which, should the infrastructure component no longer be identified by the sensor unit, determines an adapted standstill position on the basis of the determined standstill position when the infrastructure component was still identified and a determined error value; and
   a control unit which, upon identification of an infrastructure component, initiates automated braking to a standstill at the determined standstill position and which, should the infrastructure component no longer be identified, initiates braking to a standstill at the determined adapted standstill position.

2. The system according to claim 1, wherein
   the adapted standstill position is determined by calculating a difference between the determined standstill position and the determined error value.

3. The system according to claim 1, wherein
   the adapted standstill position is determined on the basis of the determined standstill position when the infrastructure component was identified and on the basis of a determined worst-case error value by calculating a difference between determined standstill position and determined worst-case error value, wherein the worst-case error value is determinable on the basis of available information about a worst-case scenario.

4. The system according to claim 1, wherein
   the error value is determinable on the basis of known information of the sensor unit.

5. The system according to claim 1, wherein
   the error value is determinable on the basis of known information about measurement accuracy errors of the sensor unit.

6. The system according to claim 5, wherein
   the error value is the worst-case error value.

7. The system according to claim 1, wherein
   the error value is determinable on the basis of one or more of:
   available information about a current vehicle speed, a last detected or determined distance between the motor vehicle and a last determined standstill position,
atmospheric condition information,
information about time of day, and
further available information about vehicle surroundings.

8. The system according to claim 1, wherein
the error value is determinable on the basis of available fleet data, which is made available by a link to a backend system.

9. The system according to claim 8, wherein
the fleet data comprises at least one or more of the following information items:
vehicle derivative,
type of sensor,
distance-dependent determined sensor signal, and
retrospectively corrected sensor signal.

10. The system according to claim 1, wherein
the error value is determinable on the basis of available information about earlier determined error values or deviations between the determined standstill position and an actually applicable stopping position.

11. A method for automated longitudinal guidance of a motor vehicle, said method enabling automatic braking of said motor vehicle to a standstill on the basis of an identified infrastructure component that requires braking of the motor vehicle to a standstill, the method comprising the acts of:
identifying an infrastructure component from a sensor unit that requires braking of the motor vehicle to a standstill;
upon identification of the infrastructure component, determining a standstill position on the basis of currently available information about the infrastructure component from the sensor unit;
should the previously identified infrastructure component no longer be identified by the sensor unit, determining an adapted standstill position on the basis of the determined standstill position when the infrastructure component was still identified and a determined error value; and
upon identification of an infrastructure component, initiating automated braking to a standstill at the determined standstill position and, should the infrastructure component no longer be identified, initiating automated braking to a standstill at the determined adapted standstill position.

\* \* \* \* \*